(12) United States Patent
Atkinson et al.

(10) Patent No.: US 8,746,386 B2
(45) Date of Patent: Jun. 10, 2014

(54) VEHICLE PERFORMANCE ENHANCING APPARATUS

(75) Inventors: Aaron William Joseph Atkinson, Glendale, AZ (US); Charles Christopher Garnett, Farmington Hills, MI (US); Rob Anthony McConnell, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 192 days.

(21) Appl. No.: 13/006,348

(22) Filed: Jan. 13, 2011

(65) Prior Publication Data

US 2012/0181802 A1    Jul. 19, 2012

(51) Int. Cl.
  *B60K 11/06*    (2006.01)
(52) U.S. Cl.
  USPC ......................................... 180/68.3; 123/41.7
(58) Field of Classification Search
  USPC ................................ 123/41.7; 180/68.1–68.3
  See application file for complete search history.

(56) References Cited

U.S. PATENT DOCUMENTS

| | | | |
|---|---|---|---|
| 4,361,352 A | 11/1982 | Wakamatsu | |
| 4,420,057 A * | 12/1983 | Omote et al. ................ | 180/68.3 |
| 4,645,249 A | 2/1987 | Nagoshi et al. | |
| 4,917,203 A | 4/1990 | Sacco et al. | |
| 5,141,068 A | 8/1992 | Mendicino | |
| 5,860,685 A | 1/1999 | Horney et al. | |
| 6,626,483 B2 | 9/2003 | Ozawa et al. | |
| 6,945,576 B1 | 9/2005 | Arentzen | |
| 7,086,200 B2 | 8/2006 | Rathgeb | |
| 7,165,794 B2 | 1/2007 | Banry et al. | |
| 8,056,613 B2 * | 11/2011 | Frijas .............................. | 165/41 |
| 8,157,040 B2 * | 4/2012 | Khouw et al. ............... | 180/68.3 |
| 8,281,887 B2 | 10/2012 | Khouw et al. | |
| 2003/0213628 A1 * | 11/2003 | Rioux et al. ................. | 180/68.3 |
| 2005/0230162 A1 * | 10/2005 | Murayama et al. .......... | 180/68.1 |
| 2010/0032220 A1 | 2/2010 | Ohira et al. | |

FOREIGN PATENT DOCUMENTS

| | | |
|---|---|---|
| JP | 8175195 | 7/1996 |
| JP | 2000280839 | 10/2000 |

* cited by examiner

*Primary Examiner* — Jeffrey J Restifo
*Assistant Examiner* — Erez Gurari
(74) *Attorney, Agent, or Firm* — Snell & Wilmer LLP

(57) ABSTRACT

A vehicle component or apparatus usable in a motor vehicle is described herein, along with one or more examples of methods of manufacturing the same. The vehicle component may function to provide the feature of blocking water entering from a grille opening from reaching the engine. In situations where flooding occurs and the water level rises, thus immersing portions of the car such as the wheels, the vehicle component may block some of the water from rising beyond a certain level and thus reduce the likelihood that water may reach and damage the engine. In addition or alternatively, the vehicle component may function to separate air flow entering from the lower grille and upper grille openings, respectively, thereby increasing the efficacy of engine cooling by the air flows.

20 Claims, 6 Drawing Sheets

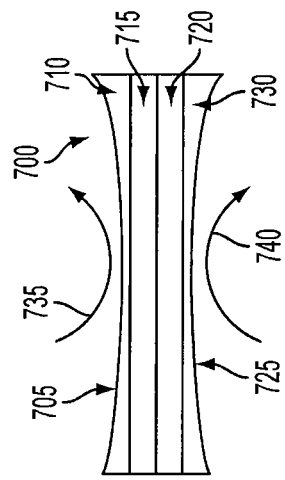
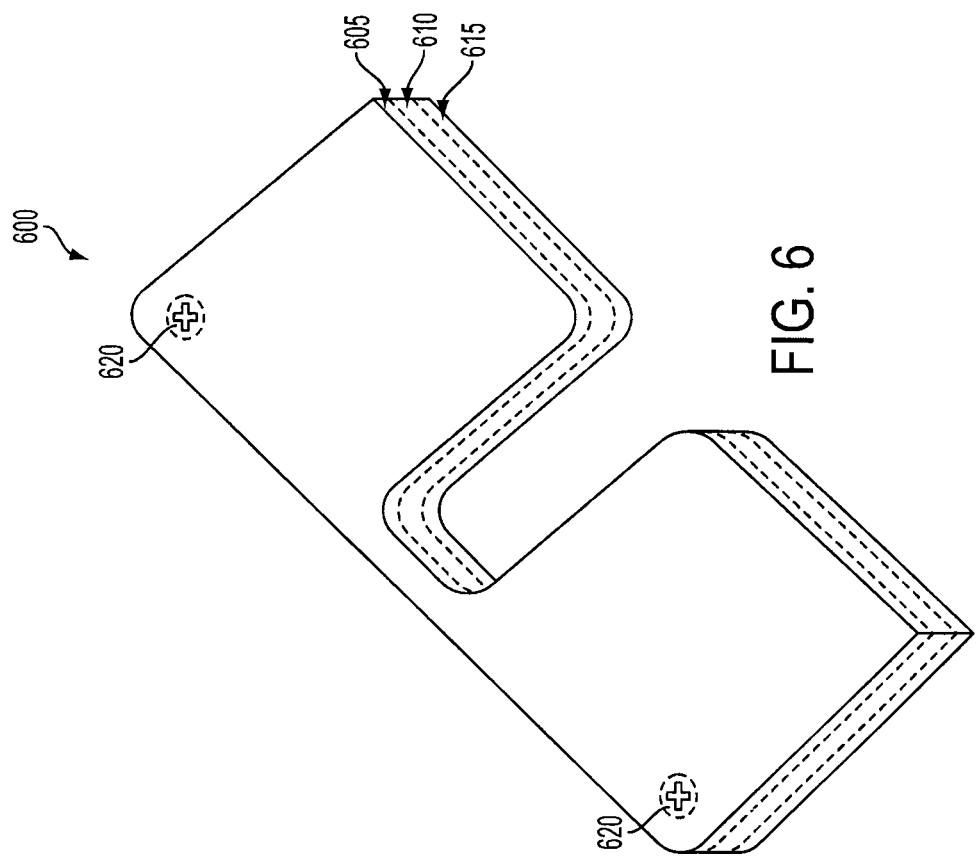
FIG. 7
FIG. 6

VEHICLE PERFORMANCE ENHANCING APPARATUS

BACKGROUND

1. Field

The present invention relates to an apparatus for blocking water, for example, as used in motor vehicles to protect certain parts, such as the engine from getting wet. More particularly, the present invention relates to a vehicle component capable of blocking water and other substances from entering the engine, for example, while the vehicle is in operation. Furthermore, another potential benefit may be achieved when the water blocking component is coupled to an engine cooling component or the water blocking component is configured to act as an engine cooling component.

2. Description of the Related Art

Consumers may purchase motor vehicles such as cars, trucks and vans for a number of reasons. This list of reasons may include "looks" or how attractive a vehicle is in the eyes of the purchaser. It follows then that vehicle design and manufacturing companies attempt to make vehicles that offer, among other benefits, an attractive exterior. So, in order to sell more vehicles, car manufacturing companies are inclined to design a more attractive vehicle. To achieve this end, vehicles that have a larger grille have been determined to be more attractive to a significant portion of the purchasing public. However, another important factor in attracting customers is reliability. To this end, protecting the engine of a vehicle so that the vehicle may continue to run is well understood by most drivers to be of the utmost importance. In other words, most drivers even with the most basic understanding of vehicles would know that keeping a vehicle's engine in a functional state is important. Along this vein, much advancement has been made to protect the engine in a number of different scenarios. For example, upon detection of impact collisions, some engines are designed to drop beneath the vehicle and out of harms way before taking on damage. However, one area of engine protection that has not been fully developed is how to protect the engine when the vehicle is in, for example, a very wet environment where floods may occur frequently.

Based on the above, vehicles with large grilles and reliable engine performance thus are desirable commercially. However, one drawback to incorporating a larger grille is that the surface area of the grille is increased for which water may be able to find its way through the grille. If water should travel into the engine in an unintended way, the consequences may be severe. For example, the engine may cease to function and the driver may have to spend a large sum of money to buy a functional engine and replace the non-functional engine.

One solution currently practiced is to place the air intake duct leading into the engine inside the interior of the engine compartment. However, by moving the air intake duct to the interior of the engine compartment, the engine intake air is heated and performance of the vehicle may be decreased, and in particular, engine life or performance may be compromised.

SUMMARY

The present invention includes a vehicle component configured to block water and other substances from rising from below and entering into the air intake duct, thereby allowing the air intake duct to remain exterior to or outside of the engine compartment. For example, in situations where flooding occurs and the water level rises, thus immersing portions of the vehicle such as the wheels, the vehicle component may block the water from rising beyond a certain level and thus reduce the likelihood that water may reach and damage the engine. Furthermore, the vehicle component may function as an engine cooling device. In one embodiment, this may be achieved by integrating the water blocking device of the vehicle component to an engine cooling device of the vehicle component.

In one embodiment, the vehicle component configured to block rising water and/or cool the engine may be integrated with the bumper absorber. In this manner, the bumper absorber may be manufactured with the vehicle component attached or integrated. In one embodiment, the bumper absorber may be manufactured using the same materials as the vehicle component. For example, a commercial-grade foam may be used in manufacturing the bumper absorber and the vehicle component.

In one embodiment, the vehicle component may be non-integrated and separate from to the bumper absorber. That is, the vehicle component may be attachable to one of a number of other vehicle parts within the internal cavity of the vehicle including by not limited to the steel bumper reinforcement typically located adjacent to the bumper absorber.

In one embodiment, the vehicle component may include a water blocking portion and a vehicle cooling (e.g., engine cooling) portion. The water blocking portion and the vehicle cooling portion may be attached to a reinforcement portion, for example, with an adhesive. When deployed in the vehicle, the water blocking portion may be located closer to the ground when compared to the vehicle cooling portion. In this embodiment, the water blocking portion may also function as a second vehicle cooling portion. That is, the water blocking portion may work in connection with the vehicle cooling portion to enhance cooling of the engine of the vehicle.

In one embodiment, the portion of the vehicle component that blocks the water may be a first layer, and the portion of the vehicle component that functions to cool the engine may be a second layer. These two layers may be attached to one another, or may be attached to a first side and a second side, respectively, of a reinforcement layer.

This Summary is included as to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

BRIEF DESCRIPTION OF THE DRAWINGS

The features, obstacles, and advantages of the present invention will become more apparent from the detailed description set forth below when taken in conjunction with the drawings, wherein:

FIG. 6 depicts a perspective view of a vehicle component configured to block water and cool the engine according to one or more embodiments described herein;

FIG. 7 depicts a side view of a vehicle component with a curved surface according to one or more embodiments described herein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
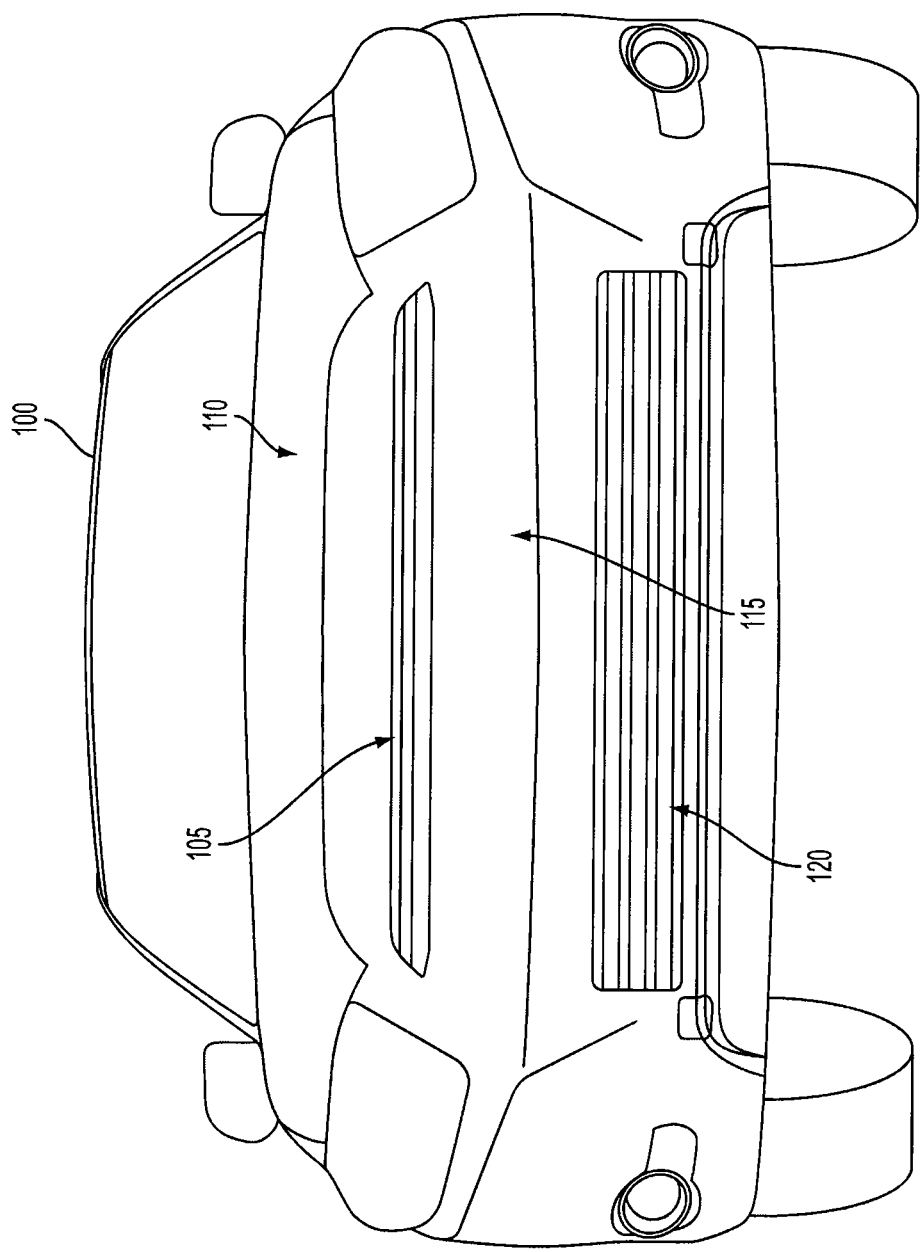
FIG. 1 depicts a front view of a vehicle according to one or more embodiments described herein.

Turning to FIG. 1, a front view of a vehicle 100 is shown. The vehicle 100 may include, among other parts and components, an upper grille 105, a hood 110, a bumper 115 and a lower grille 120. Generally, the hood 110 may be lifted open by the driver to access the engine and other portions of the vehicle otherwise concealed when the hood 110 is lowered and locked into place. The upper grille 105 and the lower grille 120, in addition to providing aesthetic appeal, further function to allow airflow into and out of the engine compartment to cool the engine. The bumper 115 functions as a safety device to protect the driver during collisions (e.g., front-end crashes).

Figure 2:
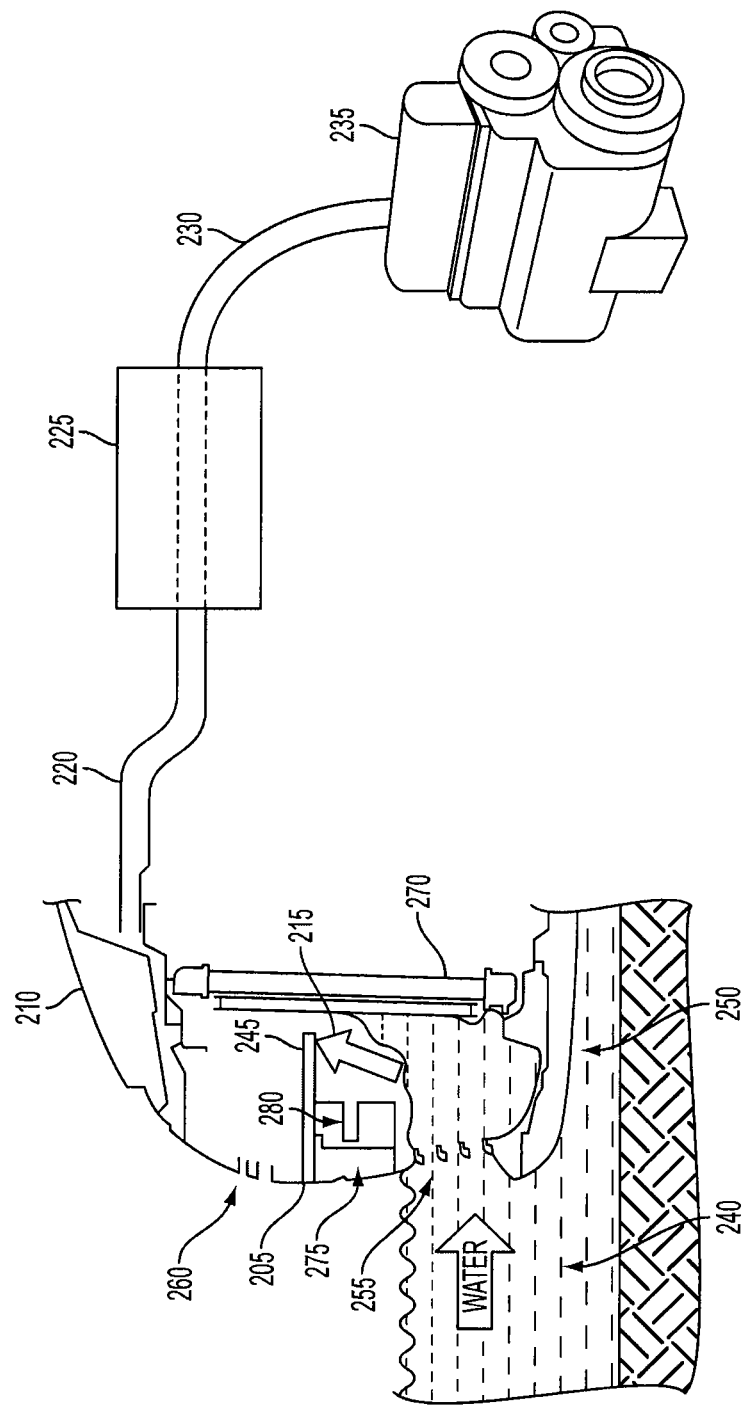
FIG. 2 depicts a vehicle component with a water blocking portion according to one or more embodiments described herein.

FIG. 2 is a side view of a portion of a vehicle. Certain vehicle parts have been omitted for clarity. FIG. 2 further diagrams the problematic situation when water has entered the vehicle (e.g., during a flood, heavy rains, situations where the vehicle is driven over a body of water and the like). In this example, as shown, water 250 may enter from outside the vehicle as shown by arrow 240 and continue to rise in the direction of arrow 215 towards an inlet duct 220, and may enter an engine 235 via an air filter box 220 and a tube 230, but for being blocked by a vehicle component 245. As shown, the vehicle component 245 significantly reduces any opportunity that the rising water 250 may have to enter the inlet duct 220. In other words, the vehicle component 245 functions as a barrier and may redirect the water 250 back down towards the ground or to an area away from the inlet duct 220. While illustrated here to be located between the upper grille 260 and the lower grille 255, attached to the bumper foam 275, the vehicle component 245 may be located elsewhere in the vehicle (e.g., between the lower grille 255 and the bumper 205). In this manner, the vehicle, and in particular, the engine may remain operable and dry even in situations where the water level is rising (e.g., during water fording situations).

In one embodiment, the vehicle component 245 may extend to completely "wall off" the area between the bumper 205 and the upper grille 260 or the radiator 270 to completely block off any channel for the water 250 to enter the upper region of the vehicle where the opening for the inlet duct 220 is located. In another embodiment, the vehicle component 245 may extend to about 75 millimeters away from the radiator 270 leaving a small gap. For this embodiment, the additional benefit of protecting the radiator 270, among other vehicle parts, during a front end collision is achievable. That is, during a crash or collision where the front bumper 205 receives an impact or force, the bumper foam 275 and the attached vehicle component 245 may stroke or displace a distance of about 75 millimeters or more before coming into contact with the radiator 270. Therefore, by designing the vehicle component 245 to be a distance of at least 75 millimeters away from the radiator 270, contact (and any damage resulting from the contact) may be avoided during these incidents. While this example discusses preserving a gap of 75 millimeters between the radiator 270 and the edge of the vehicle component 245, different gaps may be designed by shortening the vehicle component 245. That is, any gap size, e.g., between 0-300 centimeters is desirable. While some water 250 may seep through the opening, a majority of the water is blocked and thus the vehicle component 245 still effectively prevents the water level from rising sufficiently to a level where some water may enter the inlet duct 220. In this manner, the vehicle component 245 thereby may achieve the goal of preventing the water 250 from entering the engine 235. In other words, even if the water 250 gets past the vehicle component 245, the water might not reach the inlet duct 220 because the overall water level is still being reduced by the vehicle component 245.

Figure 3A:
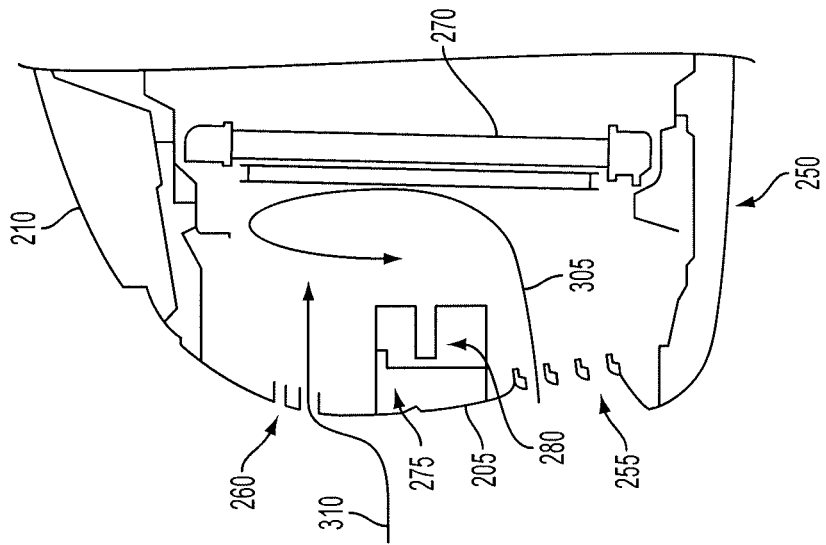
FIG. 3A depicts a vehicle component with an engine cooling portion according to one or more embodiments described herein.

FIG. 3A illustrates an enlarged side view of the area beneath the hood 210 of the vehicle. As shown, the vehicle component 245 may have a further function of engine cooling. In other words, if desired, the vehicle component 245 can also act or function as an engine cooling component. As shown by arrows 305 and 310 to designate air flow, the air may enter the vehicle and cool the engine through the lower grille 255 and the upper grille 260, respectively. The air may enter the vehicle, for example, as the vehicle is driven. Since the engine may begin to heat up during operation, the air may enter the vehicle and cool the engine, thereby preventing overheating and allow the engine to continue to function effectively. Arrow 310 depicts the air entering through the upper grille 260. Arrow 305 depicts the air entering through the lower grille 255. As shown, the vehicle component 245 effectively separates the path of air shown by the arrow 310 and the path of air shown by the arrow 305. In this manner, the air paths 305 and 310 do not impede each other and the air 310 entering from the upper grille 260 may cool the engine simultaneously with the air 305 entering from the lower grille 255. While this embodiment describes the vehicle component 245 having both water blocking and engine cooling features, alternative embodiments where the structure providing the water blocking feature and the structure providing the engine cooling feature are separated are also possible and described in detailed herein.

Figure 3B:
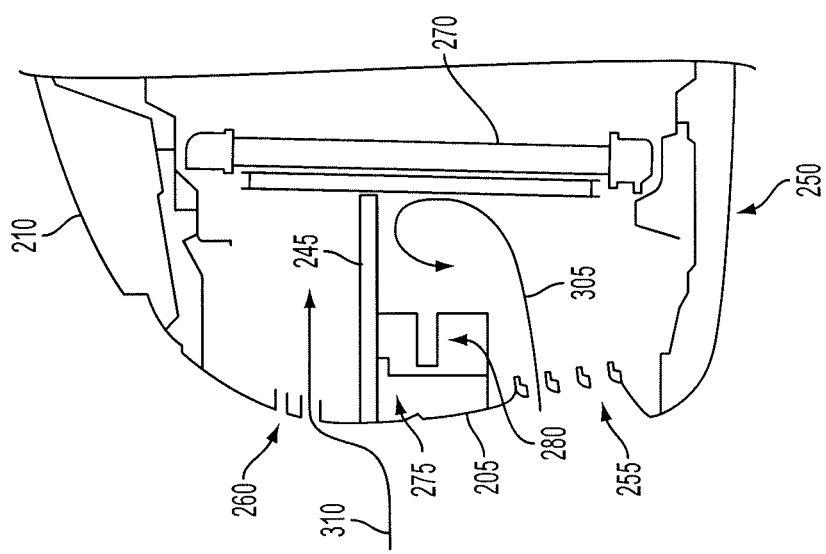
FIG. 3B depicts a vehicle without a vehicle component for cooling the engine of the vehicle according to one or more embodiments described herein.

FIG. 3B illustrates the scenario where the vehicle component 245 is not included. As shown, the air paths 305 and 310 are not separated, and the air path 305 may form a "wall" or otherwise prevents air path 310 from cooling the engine. As a result, the engine might not receive the advantage of being cooled by both air currents 305 and 310, and may overheat or suffer a reduction in effectiveness. In other words, without having the vehicle component 245 separating the two air currents 305 and 310 (as shown in FIG. 3A), a reduction in engine cooling may result.

Figure 4:
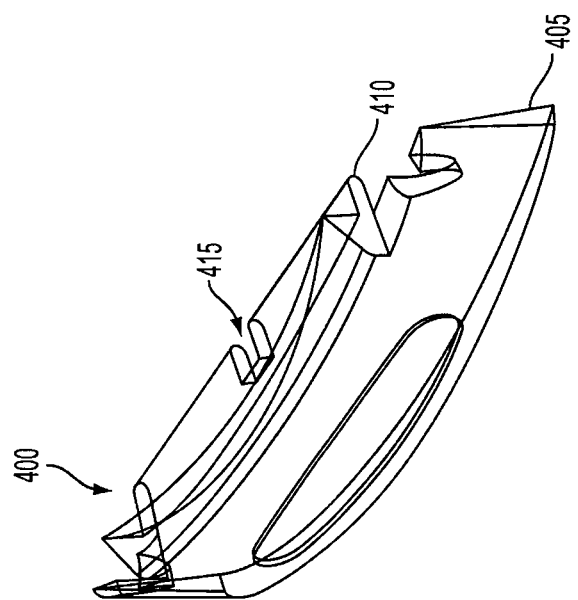
FIG. 4 depicts a perspective view of a bumper integrated with a vehicle component configured to block water and cool the engine according to one or more embodiments described herein.

Turning to FIG. 4, one embodiment of a bumper absorber 400 is illustrated with an absorber portion 405 and an extension portion 410. The bumper absorber 400 may be a foam absorber. In this embodiment, the extension portion 410 may be a vehicle component 245 described above to provide water blocking features and/or engine cooling features. As shown, the extension portion 410 may be integrated as part of the bumper absorber 400, and connected to the absorber portion 405. As manufactured, the extension portion 410 and the absorber portion 405 may be constructed as one piece using substantially the same material (e.g., a construction grade foam), where the extension portion 410 may be substantially orthogonal to the absorber portion 405. The extension portion 410 may be configured to function as a water blocking component and may have a width substantially spanning the space between the absorber portion 405 and a radiator (e.g., radiator 270). In this manner, the extension portion 410 may prevent water from rising above the height of the bumper absorber 400 and thereby decrease the risk of having the water enter into an inlet duct leading to the engine. Alternatively or in addition, the extension portion 410 may also promote engine cooling by separating the air entering the upper grille 260 (e.g., generally located above the bumper absorber 400) and the air entering the lower grille 255 (e.g., generally located below the bumper absorber 400). As shown, the extension portion 410 may further include an opening 415. The opening 415 may function to allow vehicle access to a hood lock. The extension portion 410 may span the entire front portion of the vehicle.

Figure 5:
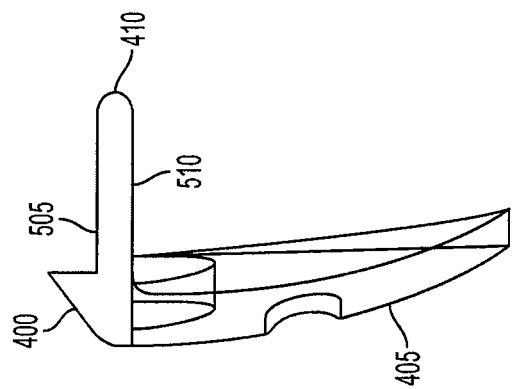
FIG. 5 depicts a side view of a bumper integrated with a vehicle component configured to block water and cool the engine according to one or more embodiments described herein.

FIG. 5 illustrates a side view of the bumper absorber 400. Here, the extension portion 410 is divided into an engine cooling portion 505 and a water blocking portion 510. The engine cooling portion 505 sits on top of the water blocking portion 510. In one embodiment, the engine cooling portion 505 may be constructed out of a different material than the water blocking portion 510. For example, the engine cooling portion 505 may be constructed out of a heat resistant material or coated with a heat resistant paint. In this manner, the engine cooling portion 505 may assist to cool the air before the air reaches the engine thereby increasing the efficacy of the engine cooling. The water blocking portion 510 may be constructed out of a water-resistant or water repelling material. Alternatively, the water blocking portion 510 may be coated with a water-repellant paint or seal. In one embodiment, the water blocking portion 510 may be considered as a second engine cooling portion (where the first engine cooling portion is engine cooling portion 505). That is, the surface of the water blocking portion 510 may also function to separate air flow entering from a lower grille opening.

In one embodiment, the extension portion 410 might not be attached to the bumper absorber 400. Instead, the extension portion 410 may be held in place by screws, bolts, adhesive and the like, attaching the extension portion 410 to metal reinforcements (e.g., bumper reinforcement 280 of FIG. 2) located adjacent to the extension portion 410 (not shown). The metal reinforcements may function to hold the extension portion 410 and to further provide support or reinforcement to the bumper foam 400. This embodiment may be advantageously used to retrofit already existing vehicles with the extension portion 410.

FIG. 6 illustrates an exemplary embodiment of the extension portion (e.g., extension portion 600) which may be suitable for retrofitting into older vehicles or vehicles otherwise already existing in the marketplace. As shown, the extension portion 600 may include one or more layers. For example, in this embodiment, three layers are shown. A first layer 605 may be an engine cooling layer. As shown, the first layer 605 may be attached to a second layer 610. The second layer 610 may be a reinforcing layer. That is, the second layer 610 may provide structural support to the first layer 605. Since the first layer 605 is configured to be a barrier for air entering the vehicle through the upper grille, a strong current of air may dent, damage or otherwise bend the first layer 605. However, by having the first layer 605 substantially in contact and reinforced by the second layer 610 such negative effects may be reduced and/or eliminated. The second layer 610 may be attached on the other side to a third layer 615. The third layer 615 may function to prevent air entering from beneath the car and/or from a lower grille opening to rise past the third layer 615 and impact the path of the air current entering through the upper grille. In addition, the third layer 615 may act as a barrier to rising water and may function to prevent water from reaching the vehicle engine. As shown, the second layer 610 may also provide structural support to the third layer 615. Especially effective in situations where the pressure caused by the water contacting the third layer 615, the second layer 610 may fortify the third layer 615 to increase the effectiveness of the third layer 615 in being able to repel the water. In addition, one or more screws 620 may be employed to fix the extension portion 600 to the vehicle (e.g., screwing the extension portion 600 to a foam absorber reinforcement component). In one embodiment, the three layers may be of equal uniform thickness. However, alternatively, each layer may be of different thicknesses. For example, the reinforcement layer 610 may be thicker than each of the first layer 605 and the third layer 615. By having a thicker reinforcement layer 610, both the first layer 605 and the third layer 615 may be significantly bolstered while keeping the overall thickness of the combined three layers at a minimum. The materials used to construct each of the three layers 605, 610 and 615 may be identical. For example, a large piece of highly-dense foam may be used to construct the three layers. Alternatively, each of the three layers may be constructed of different materials. For example, the first layer 605 may be a sheet of smooth, lightweight plastic or heat-resistant polymer suitable for deflecting and/or cooling the air. The second layer 610 may be a harder, sturdier substance such as a metal or a hard plastic suitable for reinforcement functionality. The third layer 615 may be a water-resistant plastic suitable for acting as a barrier to water. The implementation of multiple layers as described in this embodiment may be equally adaptable into any of the other embodiments described herein.

FIG. 7 illustrates a side view of an embodiment of a water-blocking/engine cooling apparatus 700. Generally, FIG. 7 may look and operate similarly to the extension portion shown in FIG. 4 or FIG. 6. However, FIG. 7 may be modified to include curved edges or lips. That is, the extension portion may include a first lip on a first surface or layer (e.g., an engine cooling layer 710) and a second lip on a second surface or layer (e.g., a water blocking layer 730). The respective lips or curved edges of the surfaces or layers are configured to better direct airflow toward the engine (e.g., with respect to the engine cooling layer 710) or water away from the engine (e.g., with respect to water blocking layer 730). Arrows 735 and 740 illustrate the direction of airflow and water flow directed by the lipped portions of layers 710 and 730, respectively. As shown, apparatus 700 includes two reinforcement layers 715 and 720. The reinforcement layer 715 may be closer to the engine cooling layer 710 and may be configured to structurally support the engine cooling layer 710. Conversely, the reinforcement layer 720 may be closer to the water blocking layer 730. Accordingly, the reinforcement layer 720 may be configured to structurally support the engine cooling layer 730. In addition, the respective reinforcement layers may act to keep heat from being transferred from the engine cooling layer 710 to the water blocking layer 730, and vice versa. By preventing heat transfer from the water blocking layer 730 to the engine cooling layer 710, the engine cooling layer 710 may remain cooler and more effectively cool air flow traveling to the engine, thereby cooling the engine. Thus, in one embodiment, the reinforcement layers 715 and 720 may be heat-resistant layers.

Figure 8:
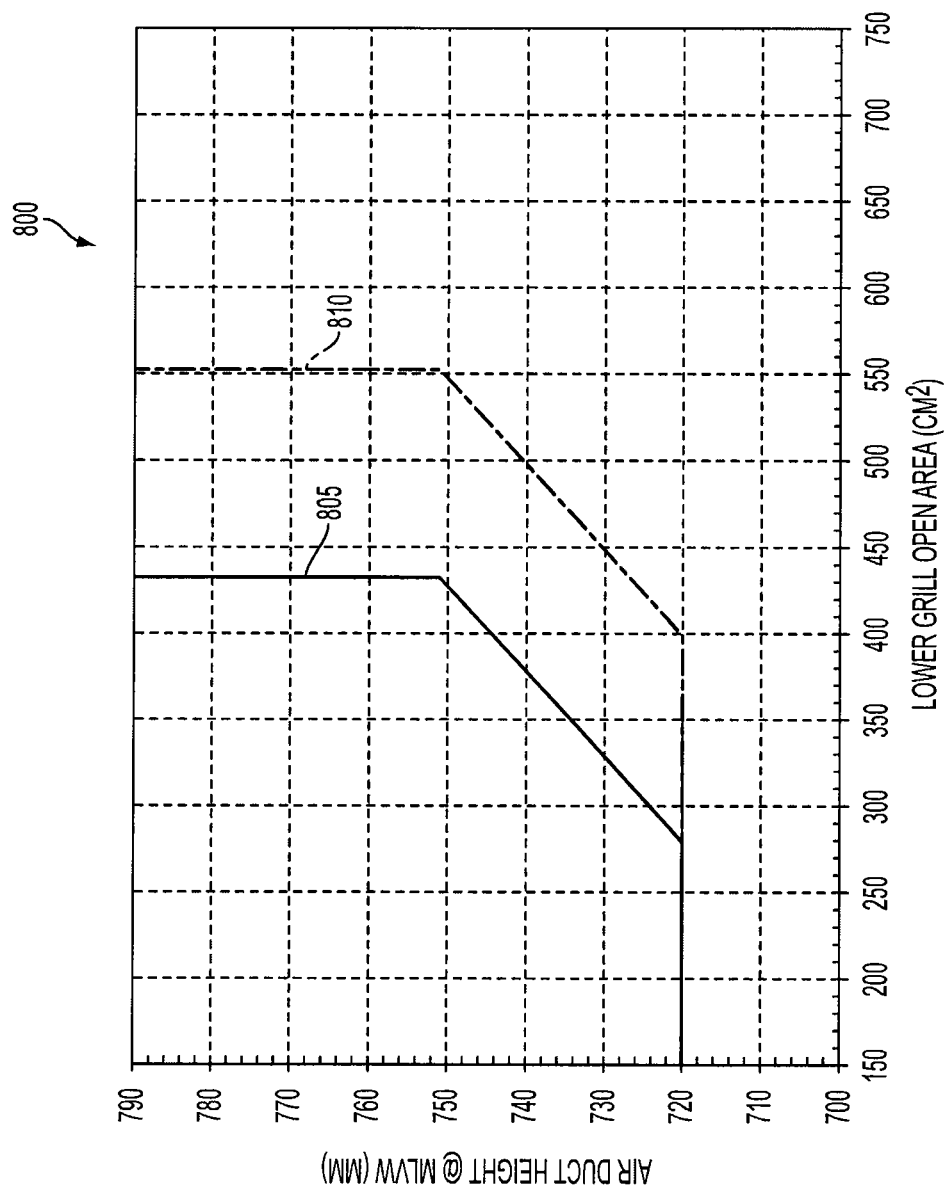
FIG. 8 depicts the results of one example of a performance test comparing a lower grille open area for a vehicle without the water blocking vehicle component, and the lower grille open area for a vehicle with the water blocking vehicle component according to one or more embodiments described herein.

FIG. 8 illustrates one potential advantage of the extension portion (e.g., extension portion 400, extension portion 600 and/or water-blocking/engine cooling apparatus 700). As shown, the lower grille area/air duct height relationship may be improved. That is, a larger grille area may be incorporated without raising the air duct height. Such an advantage may be desirable in situations where a vehicle may be designed to have a larger grille (which as discussed herein may have significant commercial impact as some individuals prefer vehicles with larger grille sizes) without increasing the likelihood that the water may enter the engine through the air duct. Indeed, the lower grille area may be increased from 250 cm squared to 400 cm squared at an air duct height of 720 millimeters, an improvement of over 60%. In other words, the lower grille open area may be increased by 60% for an air duct height of 720 millimeters without increasing the risk of the water undesirably entering the engine by employing an extension portion described herein.

In another embodiment, the shape of the extension portion (e.g., extension portion 400, extension portion 600 and/or water-blocking/engine cooling apparatus 700) may be further modified. As shown in FIG. 4, one possible shape is a dual winged extension portion. However, one alternative shape may be an extension portion without the cut-out for the hood lock. Such an extension portion may be advantageous in a situation where the placement or attachment of the extension portion is varied (e.g., being located beneath the bumper foam reinforcements). In another embodiment, a single lip edge may be possible. For situations where overheating of the engine is reduced but with an increased chance of flooding (e.g., cold and rainy or flooding climates), the upper lip (e.g., as shown in FIG. 7) might not be practical or necessary, but a larger lip may be desirable to further prevent flooding. The reverse is also possible for situations or locales that are hot and dry.

In other embodiments as discussed herein, many different materials may be used to construct the extension portion. For example, foams, plastics, metals and the like may be mixed and matched to achieve the preferred results. And even among one material, different densities may be employed. For example, a foam may be used to construct each layer of FIG. 7. However, different densities of foam may be employed for each layer depending on the function of the layer. For a layer utilized mainly to deflect water, a very dense foam may be desirable so that the water is not absorbed into the foam. Alternatively, for a layer utilized to mainly deflect air, a lighter, less dense foam may be used to keep the weight of the component light since water deflection is not required for the layer.

Skilled artisans may implement the described functionality in varying ways for each particular application, but such implementation decisions should not be interpreted as causing a departure from the scope of the disclosed apparatus and/or methods.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A vehicle component configured to block undesired substances from reaching another vehicle component, comprising:
    an attachment portion configured to attach to a vehicle;
    a substance blocking layer adjacent to the attachment portion and substantially spanning an entire front portion of the vehicle, the substance blocking layer configured to block the undesired substances from penetrating the substance blocking layer and reaching the another vehicle component; and
    an engine cooling layer extending horizontally from the attachment portion and adjacent to the substance blocking layer and configured to significantly limit a first air path flowing by a first side of the engine cooling layer from impeding a second air path flowing by a second side of the engine cooling layer.

2. The vehicle component of claim 1, further comprising a component reinforcement portion in contact with the substance blocking layer, the component reinforcement portion lying on a plane substantially parallel to a plane that the substance blocking layer lies on, the component reinforcement portion configured to increase the capability of the substance blocking layer to block the undesired substances.

3. The vehicle component of claim 2, wherein the engine cooling layer is in contact with the component reinforcement portion, and the second air path enters an upper grille of the vehicle and flows over the engine cooling layer and the first air path enters a lower grille of the vehicle and flows below the engine cooling layer.

4. The vehicle component of claim 3, wherein a plane where the engine cooling layer lies on is substantially parallel to the plane which the substance blocking layer lies on.

5. The vehicle component of claim 1, wherein the undesired substance is water entering the vehicle from beneath the vehicle or from a front grille of the vehicle.

6. The vehicle component of claim 1, wherein the another vehicle component is an inlet duct leading to an engine of the vehicle or the engine of the vehicle itself.

7. The vehicle component of claim 4, wherein the engine cooling layer, the substance blocking layer and the component reinforcement portion are constructed out of the same material.

8. The vehicle component of claim 3, wherein the engine cooling layer, the substance blocking layer and the component reinforcement portion are each constructed out of foam having different densities.

9. The vehicle component of claim 7, wherein each of the engine cooling layer, the substance blocking layer and the component reinforcement portion are constructed out of foam.

10. An impact absorber apparatus, comprising:
    an absorber portion attached to a front bumper of a vehicle and configured to absorb impact when a force is applied to the front bumper of the vehicle;
    a water blocking portion attached to the absorber portion, the water blocking portion configured to block water from penetrating the water blocking portion;

a reinforcement portion attached on one side to the water blocking portion, the reinforcement portion configured to reinforce the water blocking portion; and
an engine cooling portion attached to a second side of the reinforcement portion, the engine cooling portion configured to act as a barrier significantly limiting air entering the vehicle through a lower grille opening from impeding air entering the vehicle through an upper grille opening, wherein the reinforcement portion is further configured to reinforce the engine cooling portion.

11. The impact absorber apparatus of claim 10, wherein the water blocking portion, the reinforcing portion and the engine cooling portion form an extension component, the edge of the extension component closest to a radiator and the closest point therefrom on the radiator forms a gap between the extension component and the radiator.

12. The impact absorber apparatus of claim 11, wherein the gap is at least 75 millimeters in length.

13. The impact absorber apparatus of claim 10, wherein a surface of the water blocking portion furthest away from the engine cooling portion forms a curve.

14. The impact absorber apparatus of claim 13, wherein a surface of the engine cooling portion furthest away from the curved surface of the water blocking portion forms a curve.

15. The impact absorber apparatus of claim 10, wherein the water blocking portion includes a layer of water-repellant paint.

16. The impact absorber apparatus of claim 10, wherein the engine cooling portion includes a layer of heat-resistant paint.

17. An apparatus configured to be deployed in a vehicle, the apparatus comprising:
an engine cooling layer having a top side and a bottom side, the top side of the engine cooling layer being heat resistant, the engine cooling layer configured to significantly limit a first air path flowing by the bottom side of the engine cooling layer from impeding a second air path flowing by the top side of the engine cooling layer;
a reinforcement layer having a first side and a second side, the first side of the reinforcement layer being attached to a bottom side of the engine cooling layer; and
a water blocking layer having a top side and a bottom side, the top side of the water blocking layer attached to the second side of the reinforcement layer, the bottom side of the water blocking layer configured to repel water such that the water blocking layer is configured to redirect water from a water level rising from below the vehicle.

18. The apparatus of claim 17, wherein the reinforcement layer is configured to provide the engine cooling layer and the water blocking layer with structural support.

19. The apparatus of claim 17, wherein the apparatus is attached to a bumper absorption portion or a bumper absorption reinforcement portion of a vehicle, the apparatus being located between an upper grille and a lower grille of a vehicle.

20. The apparatus of claim 17, wherein at least one of the engine cooling layer, the reinforcement layer and the water blocking layer is constructed out of foam.

\* \* \* \* \*